United States Patent [19]

Newman et al.

[11] Patent Number: 4,854,193
[45] Date of Patent: Aug. 8, 1989

[54] KEY INTERLOCK SYSTEM FOR AUTOMATIC FLOOR MOUNTED TRANSMISSION SHIFTER

[75] Inventors: Gordon A. Newman, Adrian; William J. Gilmore, Manitou Beach, both of Mich.

[73] Assignee: Babcock Industries Inc., Fairfield, Conn.

[21] Appl. No.: 173,368

[22] Filed: Mar. 25, 1988

[51] Int. Cl.$^4$ .............................................. G05G 9/16
[52] U.S. Cl. ........................................ 74/850; 70/248
[58] Field of Search .................. 74/850, 500.5, 501.6, 74/529; 192/4 A; 70/247, 245, 248, 251, 256, 257; 292/160, 142, DIG. 25; 180/272

[56] References Cited

U.S. PATENT DOCUMENTS

| | | | |
|---|---|---|---|
| 3,161,075 | 12/1964 | Horning et al. | 74/850 |
| 3,490,255 | 1/1970 | Wight et al. | 70/248 |
| 3,765,262 | 10/1973 | Mendenhall et al. | 70/248 |
| 4,096,717 | 6/1978 | Cymbal | 70/248 |
| 4,232,571 | 11/1980 | Kimberlin | 70/247 X |
| 4,235,123 | 11/1980 | Simancik et al. | 70/247 X |
| 4,304,112 | 12/1981 | Osborn | 70/247 |
| 4,474,085 | 10/1984 | DeVogelaere et al. | 70/248 X |
| 4,712,397 | 12/1987 | Niskanen | 70/248 |
| 4,724,722 | 2/1988 | Beauch et al. | 74/850 |

Primary Examiner—Dwight G. Diehl
Attorney, Agent, or Firm—Barnes, Kisselle, Raisch, Choate, Whittemore & Hulbert

[57] ABSTRACT

A key interlock system for an automatic floor mounted transmission shifter adapted to be used with an ignition key located in the steering column and adapted to translate a key slide actuator upon rotation of the key through a pinion acting on a gear rack on the slide actuator includes a cable assembly with a conduit fixed at one end adjacent the ignition key and at the other end adjacent the automatic floor mounted transmission shifter. A strand is connected at one end to a spring loaded pawl adjacent the actuator and at the opposite end to a shifter cam plate adjacent the shifter. In the key out position, the pawl engages the key actuator placing the strand in tension so that the shifter is prevented from movement from a park position. When the key is advanced to the start, run or off position, the pawl engages a groove in the key actuator allowing the shifter cam plate to be moved from park position to the desired drive gear position. When the shifter is advanced to a drive position, the shifter cam plate is held in a position so that the pawl cannot return to a position which will permit the key actuator to move to a key out position due to the engagement of the pawl with the edge of the groove in the key actuator. Upon return of the shifter to park position, the cam plate relieves the tension on the strand so thar the pawl will move out of engagement with the groove edge on the key actuator, permitting the key to be turned to the key out or accessory positions.

5 Claims, 2 Drawing Sheets

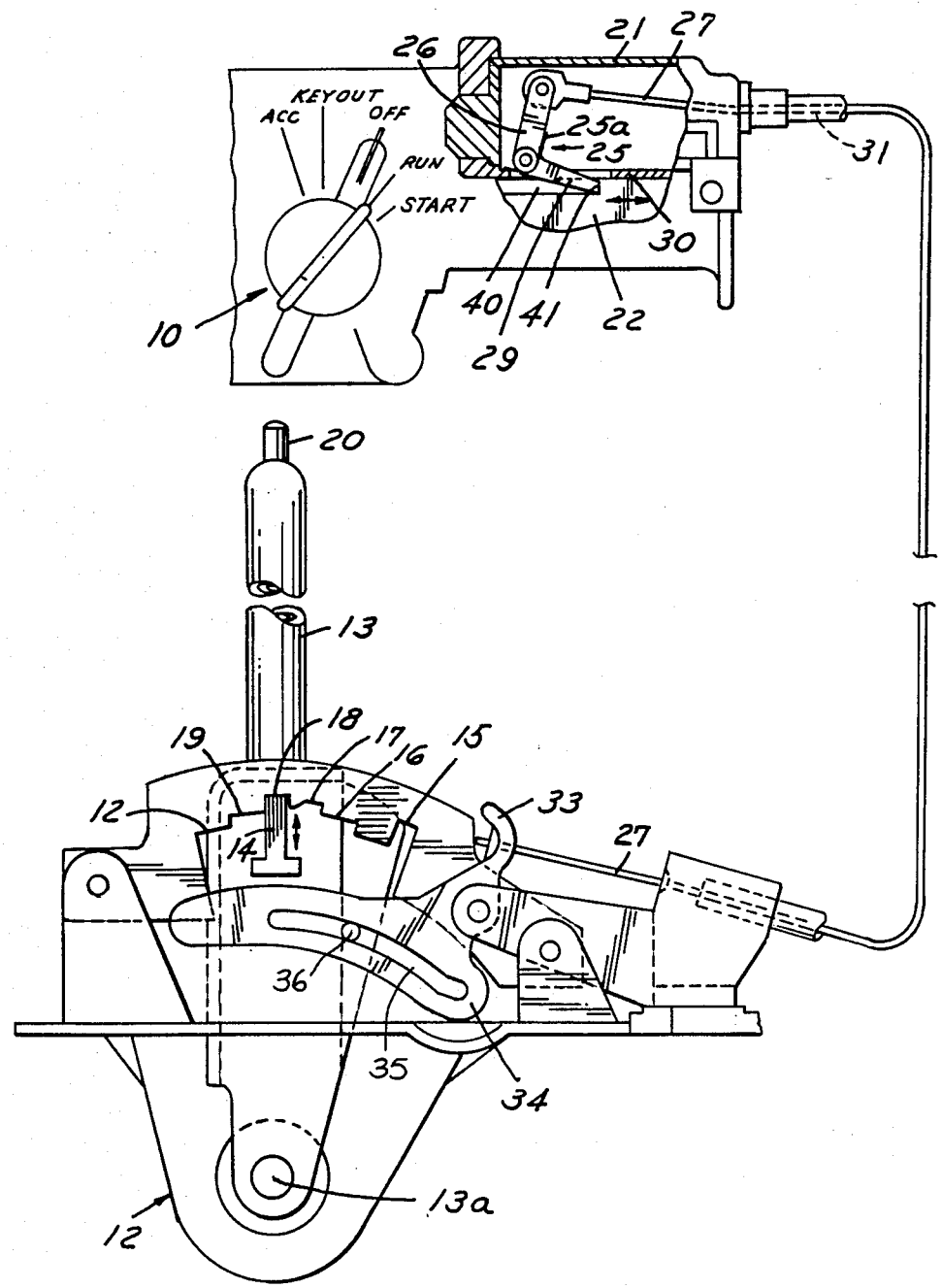

KEY INTERLOCK SYSTEM FOR AUTOMATIC FLOOR MOUNTED TRANSMISSION SHIFTER

BACKGROUND AND SUMMARY OF THE INVENTION

One of the problems that occurs in the operation of automobiles is that, where an automatic floor transmission shifter is provided, it is possible to remove the ignition key even when the transmission is not in park position.

Accordingly, among the objectives of the present invention are to provide a key interlock system that functions between the ignition key lock and the automatic floor mounted transmission shifter to prevent removal of the key from the ignition lock except when the transmission shifter is in parked position; which system is relatively simple and utilizes a minimum number of parts; which system is positive and cannot be bypassed; and which system is low in cost.

In accordance with the invention, a key interlock system for an automatic floor mounted transmission shifter adapted to be used with an ignition key located in the steering column and adapted to translate a key slide actuator upon rotation of the key through a pinion acting on a gear rack on the slide actuator comprises a cable assembly including a conduit fixed at one end adjacent the ignition key and at the other end adjacent the automatic floor mounted transmission shifter. A strand is connected at one end to a spring loaded pawl adjacent the actuator and at the opposite end to a cam plate adjacent the shifter. In the key out position, the pawl engages the key actuator placing the strand in tension so that the shifter is prevented from movement from a park position. When the key is advanced to the start, run or off position the pawl engages a groove in the key actuator allowing the shifter cam plate to be moved from ark position to the desired drive gear position. When the shifter is advanced to a drive position, the shifter cam is held in a position so that the pawl cannot return to a position which will permit the key actuator to move to a key out position due to the engagement of the pawl with the edge of the groove in the key actuator. Upon return of the shifter to park position, the cam plate relieves the tension on the strand so that the pawl will move out of engagement with the edge of a groove in the key actuator, permitting the key to be turned to the key out or accessory positions.

DESCRIPTION OF THE DRAWINGS

FIG. 2 is a partly schematic view of the system shown in FIG. 1 with the parts in a different operative position.

DESCRIPTION

Figure 1:
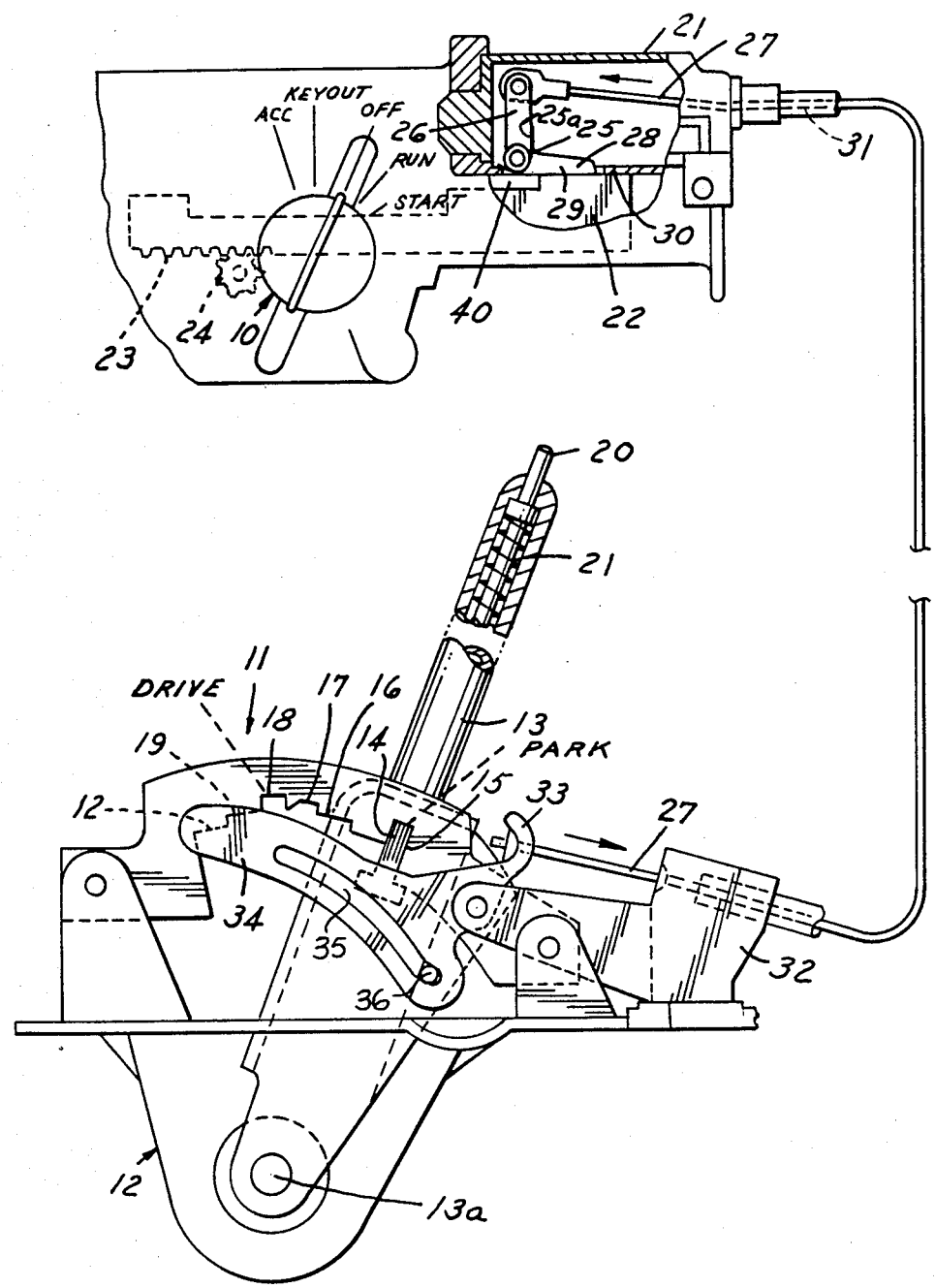
FIG. 1 is a partly schematic view of a system embodying the invention, parts being shown in section.

Referring to FIGS. 1 and 2, the key interlock system of the present invention is intended to be utilized with a conventional ignition key lock 10 which receives a key and is rotatable to a plurality of positions representing various functions including accessory, key out, off, run and start positions. The system functions in connection with a key interlock between the key out and off positions. The system functions between the key lock 10 and the automatic floor transmission shifter 11 that normally includes a frame 12 on which a shifter 13 is pivoted as at 13a between a plurality of positions including a park position and several drive positions. The shifter 13 normally includes a shifter pawl 14 that is urged upward, as viewed in FIGS. 1 and 2, for engagement with notches 15, 16, 17, 18 and 19. The notches 15, 16, 17, 18 and 19 to park, reverse, neutral, normal drive gear, first gear and second gear. The shifter pawl 14 is actuated by a shaft 20 to which it is fixed and which is urged by spring 21 into engagement with the notches. The end of the shaft 20 extends through the shifter 13 and is adapted to be depressed by the thumb for disengagement of the pawl with the park or drive positions, in accordance with conventional practice.

A key actuator slide 22 is mounted on the steering column integrally with the conventional rack 23 and is linearly driven by gear 24 which is rotatable by the key lock 10.

Such a slide and rack arrangement is conventional and well known in the art. A plastic housing 21 is mounted adjacent the key actuator slide 22 and pivotally supports a spring loaded pawl 25 which has one arm 26 connected to a strand 27. Arm 26 extends generally vertically. Pawl 25 has another arm 28 that engages the horizontal surface 30 of the actuator 22. A conduit 31 has one end thereof attached to the housing 21 and the other end thereof attached to a bracket 32 on the frame 12 of the automatic shifter. The strand 27 extends through the conduit 31 and has its other end connected to a projection 33 on a cam plate 34 which is pivoted to an arm of the bracket 32.

Cam plate 34 is provided with an elongated arcuate slot 35 which is engaged by a pin 36 on shifter 13 to control the position of the cam plate 34 and, in turn, the tension on strand 27, as presently described.

When the key lock is in the off position and the shifter is in the park position, as shown in FIG. 1, the parts have the relative positions shown with pin 36 in a straight portion of slot 35, as shown on the right in FIG. 1. When the key is moved to the run position as shown in FIG. 2, key actuator slide 22 is translated permitting the horizontal arm of the pawl 25, against the action of torsion coil spring 25a, to rotate clockwise as viewed in FIG. 2 into engagement with an elongated window or groove 40 having an edge or shoulder 41 at one end. This locks the key lock 10 preventing counterclockwise rotation.

With the ignition in the key out position, the horizontal arm 28 of pawl 25 is resting on the top of the key actuator slide 22 of the ignition switch. With the pawl 25 held up and the shifter cam plate 34 attached to the opposite end of the strand 27, the strand 27 is now in tension and will not allow the shifter to be removed from the park position. As soon as the key is advanced to the start, run or off position, the key slide actuator is moved and the pawl arm 28 can then be pulled down into the groove 40 by the tension on strand 27 in the top of the key actuator slide 22 and this will then allow the shifter cam plate 34 to be moved from park to the drive gear desired. When the shifter is advanced to a drive position the shifter cam plate 34 is held down by tracking pin 36. With the pawl arm 28 down and the shifter in a drive gear it is then impossible for the key to be returned to the key out position. The key actuator slide 22 will be stopped by the end of the pawl arm 28 hitting the edge of the window or groove 40 in the key actuator slide 22. To turn off the ignition of the car, it becomes necessary to return the shifter to park allowing the cam plate 34 to be pulled up by the pawl spring 25a, clearing the key actuator groove 40 and permitting the key to be returned to the key out or accessory positions.

It can thus be seen that there has been provided a key interlock system for an automatic floor mounted transmission shifter adapted to be used with an ignition key located in the steering column and adapted to translate a key slide actuator upon rotation of the key through a pinion acting on a gear rack on the slide actuator, the system comprising a cable assembly including a conduit fixed at one end adjacent the ignition key and at the other end adjacent the automatic floor mounted transmission shifter. A strand is connected at one end to a spring loaded pawl adjacent the actuator and at the opposite end to a cam plate adjacent the shifter. In the key out position, the pawl engages the key actuator placing the strand in tension so that the shifter is prevented from movement from a park position. When the key is advanced to the start, run or off position the pawl engages a groove in the key actuator allowing the shifter cam plate to be moved from park position to the desired drive gear position. When the shifter is advanced to a drive position, the shifter cam is held in a position so that the pawl cannot return to a position which will permit the key actuator to move to a key out position due to the engagement of the pawl with the edge of the groove in the key actuator. Upon return of the shifter to park position, the cam plate relieves the tension on the strand so that the pawl will move out of engagement with the edge or shoulder on the key actuator, permitting the key to be turned and to the key out or accessory positions.

We claim:

1. In an automatic floor mounted transmission shifter adapted to be used with an ignition key located in the steering column and adapted to translate a key actuator slide upon rotation of the key through a pinion acting on a gear rack on the actuator slide, a key interlock system comprising a cable assembly including a conduit and a strand,
said conduit being fixed at one end adjacent the ignition key and at the other end adjacent the automatic floor mounted transmission shifter,
a spring loaded pawl yieldingly urged into contact with a first surface of the key actuator slide when the slide is in the key out position and with a groove in the key actuator slide when the key is in the start, run or off position,
a cam plate pivotally mounted adjacent said shifter,
said strand being connected at one end to said spring loaded pawl and at the opposite end to said cam plate,
interengaging means between said shifter and said cam plate operable such that when the key is in the out position, the pawl engages the first surface of the key actuator slide placing the strand in tension so that the cam plate prevents the shifter from moving from a park position; when the key is advanced to the start, run or off positions the pawl engages the groove in the key actuator slide allowing the shifter cam plate to be moved from park to a desired drive gear position; and when the shifter is advanced to a drive position, the cam plate is held in a position by said interengaging means so that the pawl cannot return to a position which will permit the key actuator slide to move to a key out position due to the engagement of the pawl with a shoulder of the groove in the key actuator slide, and upon return of the shifter to park position, the cam plate relieves the tension on the pawl so that it will move out of engagement with the shoulder on the key actuator slide, permitting the key to be turned and returned to the key out or accessory position.

2. The key interlock system set forth in claim 1 wherein said cam plate includes an arcuate slot and a pin on said shifter extending into said slot for controlling the position of said cam plate.

3. The key interlock system set forth in claim 2 includes a bracket on which said cam plate is pivoted.

4. The key interlock system set forth in claim 3 including a housing in which said pawl is pivoted.

5. The key interlock system set forth in claim 1 wherein said pawl includes a first arm to which said strand is connected and a second arm which engages and is yieldingly urged toward said key actuator slide.

* * * * *